United States Patent [19]

Buschemeyer

[11] Patent Number: 4,902,155

[45] Date of Patent: Feb. 20, 1990

[54] LIQUID DISPENSER

[76] Inventor: Sallie Q. Buschemeyer, 254 Ridgeway Corner, Louisville, Ky. 40207

[21] Appl. No.: 222,560

[22] Filed: Jul. 21, 1988

[51] Int. Cl.$^4$ .................................................. B43K 5/00
[52] U.S. Cl. .................................. 401/206; 401/205; 401/278; 222/513
[58] Field of Search .................... 401/205, 206, 277; 222/130, 187, 207, 420, 422, 449, 454, 456, 162, 361, 362, 513, 520; 604/207-209, 289, 310, 311, 2

[56] References Cited

U.S. PATENT DOCUMENTS

| | | | |
|---|---|---|---|
| 2,974,835 | 3/1961 | Herbrick | 222/513 |
| 3,054,133 | 9/1962 | Hublard et al. | 401/205 |
| 3,128,915 | 4/1964 | Matter | 222/449 |
| 4,043,681 | 8/1977 | Funahashi | 401/206 |
| 4,376,495 | 3/1983 | Spatz | 222/207 |
| 4,568,004 | 2/1986 | Goncalves | 222/207 |
| 4,569,612 | 2/1986 | Schwartzman et al. | 401/206 |

Primary Examiner—Richard J. Apley
Assistant Examiner—D. Crosby
Attorney, Agent, or Firm—Jon C. Winger

[57] ABSTRACT

A liquid dispenser for dispensing a predetermined volume of liquid to a surface includes a bottle for containing a supply of the liquid with a movable sleeve coaxially located with and receiving the outlet end of the bottle. The sleeve includes a valve which closes and opens the bottle outlet as the sleeve moves toward and away, respectively, from the bottle outlet. The sleeve also includes a metered liquid reservoir to the opposite side of the seal from the bottle outlet for receiving a predetermined measured amount of liquid from the bottle. A valve is located at the reservoir to control the flow of liquid from the reservoir, and a dauber tip is in liquid-flow communication with the reservoir for receiving liquid from the reservoir and dispensing the liquid on a surface.

17 Claims, 2 Drawing Sheets

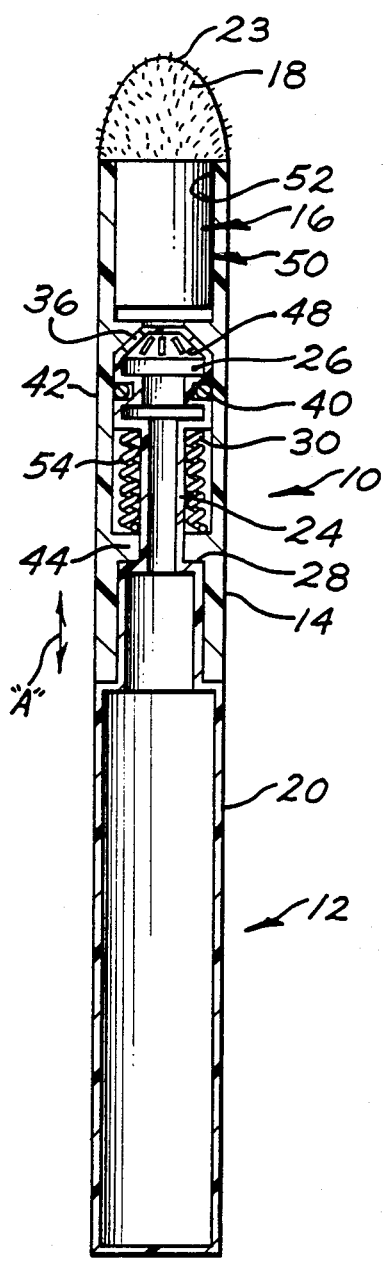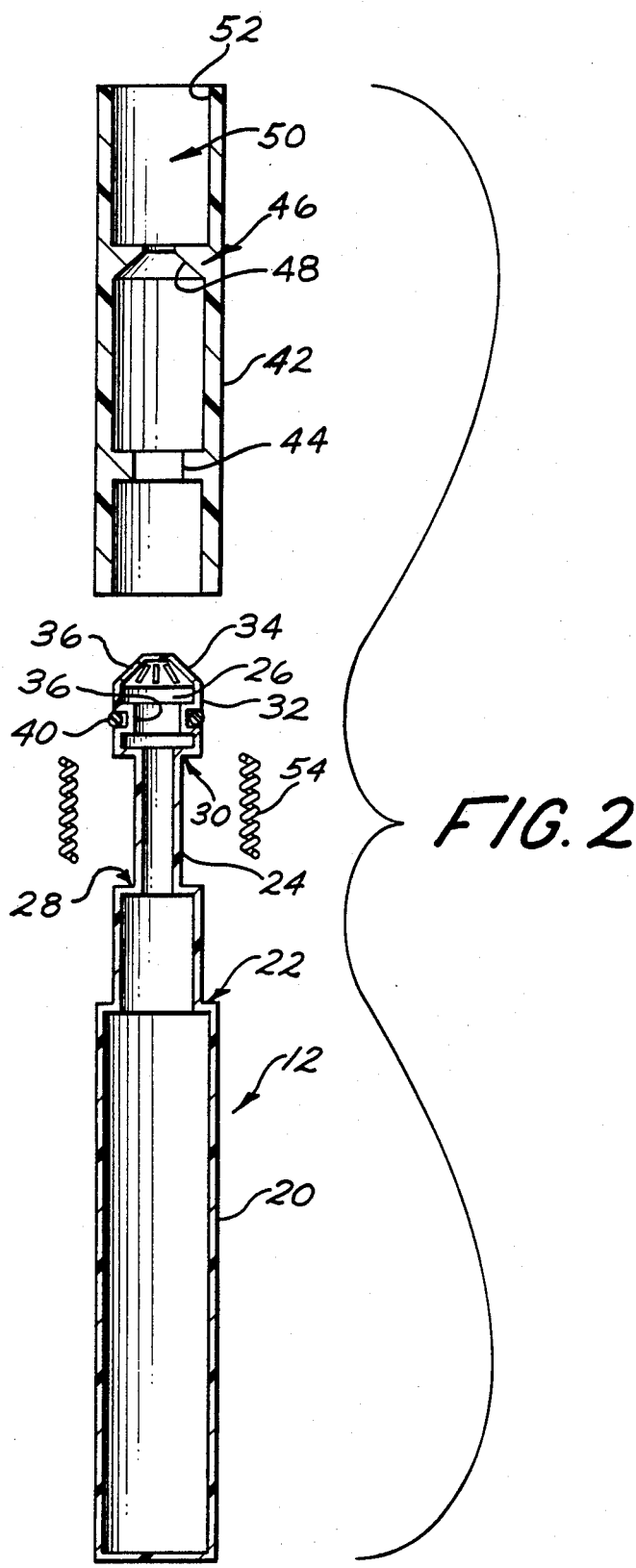

LIQUID DISPENSER

BACKGROUND OF THE INVENTION

The present invention relates to liquid applicators and dispensers, and more particularly to a liquid dispenser having a metered reservoir in flow communication with a supply container of liquid including a valve between the reservoir and container and another valve at the outlet of the reservoir.

Various liquid applicators having valves for controlling liquid flow are known By way of example, some of the heretofore known valve controlled applicators are shown in U.S. Pat. No. 3,256,551; U.S. Pat. No. 3,349,966; U.S. Pat. No. 3,481,678; U.S. Pat. No. 3,545,874; U.S. Pat. No. 4,565,294; and U.S. Pat. No. 4,569,612.

However, none of these U.S. Patents teach nor disclose a liquid applicator for applying or dispensing a predetermined, measured amount of liquid less than the total supply of liquid contained thereby.

The present invention recognizes this drawback and provides a liquid dispenser which contains a supply of liquid and which dispenses a measured or metered amount of liquid less than the amount of the supply.

SUMMARY OF THE INVENTION

The present invention provides a liquid dispenser liquid comprising a bottle for containing a supply of liquid to be dispensed, means defining an outlet for the liquid at one end of the bottle, a sleeve located at the outlet of the bottle movable toward and away from the bottle outlet, a first valve associationed with the sleeve for closing the bottle outlet of the bottle when the sleeve has moved the full extent toward the bottle outlet and for opening the liquid outlet of the bottle when the sleeve has moved away from the bottlet outlet; a metered reservoir in the sleeve for receiving liquid from the bottle; second valve means located at the reservoir outlet for controlling liquid flow from the metered reservoir; and a porous dauber tip in liquid flow communication with the reservoir outlet for receiving liquid therefrom.

DESCRIPTION OF THE DRAWINGS

A better understanding of the present invention will be had upon reference to the following drawings, wherein like numerals refer to like parts throughout the several views and in which:

FIG. 1 is a longitudinal cross-sectional view of a liquid dispenser of the present invention;

FIG. 2 is an exploded, longitudinal cross-sectional view of two major components of the present invention;

DETAILED DESCRIPTION OF THE PREFERRED EMBODIMENT

Figure 3:
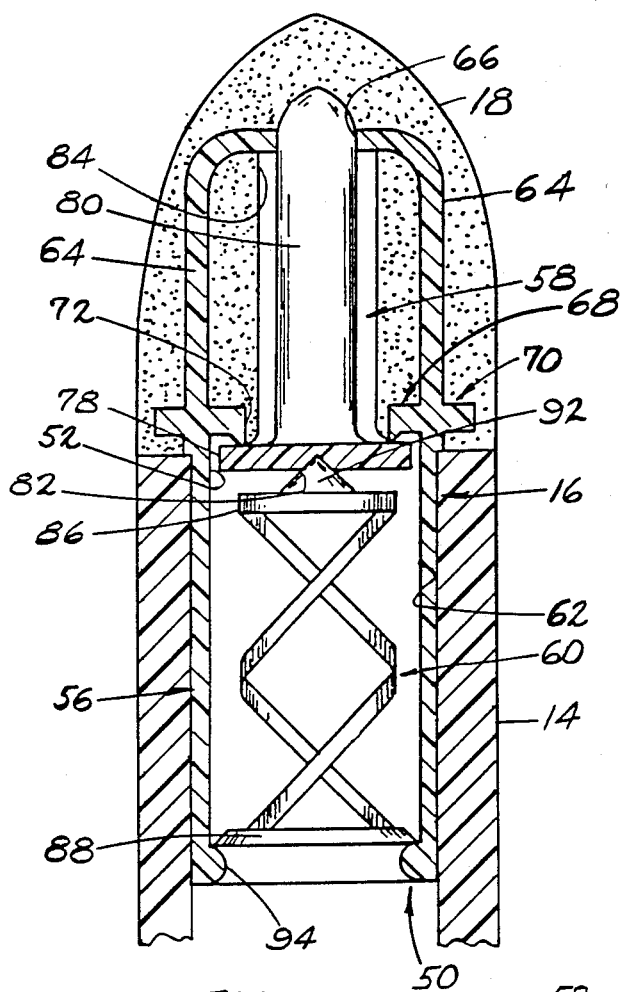
FIG. 3 is an enlarged longitudinal cross-sectional view of the top end portion of the dispenser of FIG. 1 more clearly showing the details thereof.

With reference to FIG. 1, there is shown a liquid dispenser, generally denoted as the numeral 10. The dispenser 10 includes a generally cylindrical hollow bottle 12 for containing a supply of liquid, a movable sleeve 14 coaxially receiving the top end of the bottle 12 at its proximal end and movable along the coaxis of the sleeve 14 and bottle 12 toward and away from the bottle 12, a valve assembly, generally denoted as the numeral 16, disposed in the distal end of the sleeve 14, and a dauber tip 18 associated with the valve assembly 16 at the distal end of the sleeve 14.

With reference to FIGS. 1 and 2, the bottle 12 includes a generally cylindrical body 20 having a first circumferential shoulder 22 between the top and bottom ends of the cylindrical body 20 so that the portion of the cylindrical body 20 below the circumferential shoulder 22 is larger than the portion of the cylindrical body 20 above the circumferential shoulder 22. A long hollow neck 24 extends from the top end of the cylindrical body 22 and has a hollow nozzle 26 at the distal end of the neck 24 such that the nozzle 26 is in liquid flow communication with the cylindrical body 20 through the neck 24. The neck 24 cooperates with the top end of the cylindrical body 20 to define a second circumferential shoulder 28. The nozzle 26 is generally cylindrical in profile and is larger in circumference than the neck and cooperates with the distal end of the neck 24 to define a third circumferential shoulder 30. The nozzle 26 comprises a generally cylindrical side wall 32 with a conical wall 34 converging upwardly from the top of the side wall 32. A plurality of liquid flow through apertures 36 formed in spaced apart circumferential array through the conical wall 34. The cylindrical side wall 32 of the nozzle 26 is formed with an annular groove 38 and an O-ring seal 40 is disposed in the annular groove 38. The nozzle 26 constitutes the liquid outlet of the bottle 12.

With continued reference to FIGS. 1 and 2, the sleeve 14 comprises a cylindrical wall 42 having an outside diameter about equal to the outside diameter of the larger portion of the cylindrical body 20 of the bottle 12 below the first circumferential shoulder 22, and an inside diameter about equal to the outside diameter of the smaller portion of the cylindrical body 20 above the first circumferential shoulder 22 so that the cylindrical wall 42 of the sleeve 14 fits concentrically over the smaller portion of the cylindrical body 20 with a slip fit so that the sleeve 14 can move along the coaxis of the cylindrical sleeve wall 42 and the bottle 12 toward and away from the bottle 12, or downwardly and upwardly, respectively of the bottle 12 as indicated by the double headed arrow "A" in FIG. 1. The sleeve 14 further includes a circumferential sleeve stop flange 44 projecting radially inwardly of the interior wall surface of the sleeve cylindrical wall 42 proximate the bottom end of the cylindrical wall 42 defining a circumferential edge having a diameter about equal to the diameter of the smaller portion of the cylindrical body 20 of the bottle. The sleeve 14 also includes a first valve 46 for closing the flow-through apertures 36 in the nozzle 26. The first valve 46 is a circumferential lip projecting radially inwardly of the interior wall surface of the sleeve cylindrical wall 42 positioned at a spaced interval from the sleeve stop flange 44 longitudinally of the cylindrical sleeve wall 42 toward the top end of the cylindrical wall 42 and at a spaced interval from the top end of the cylindrical wall 42. The circumferential lip 46 defines a conical surface 48 which is complimentary of the conical wall 34 of the nozzle 26 so that when the conical surface 48 of the valve lip 46 overlays the conical wall 34 of the nozzle, it closes the liquid flow-through apertures 36 in the nozzle conical wall 34. A metered reservoir 50 is defined in the sleeve 14 above the valve lip 46 and the open top of the sleeve defines the outlet 52 of the cylindrical sleeve wall 42. The sleeve 14 coaxially fits over the nozzle 26 and neck 24 of the bottle 12 with the annular sleeve stop flange 44 seated in the second circumferential shoulder 28 and the conical surface 48 of the valve lip 46 overlaying the conical wall 34 of the nozzle 26. The O-ring seal 40 is in sealing contact with the interior wall surface of the sleeve 14 to seal against liquid leakage therepast. Biasing means, such as compression springs 54 are disposed between the third shoulder 30 and top side of the sleeve stop flange 44 with one end of the spring 54 in contact with the third shoulder 30 and the other end of the spring 54 in contact with the top side of the sleeve stop flange 44. The biasing springs 54 bias the sleeve 14 downwardly along the longitudinal axis of the bottle 12 so that the conical surface 48 of the valve lip 46 is in abutting contact with the conical wall 34 of the nozzle 26 closing the liquid flow-through apertures 36 in the conical nozzle wall 34.

Figure 4:
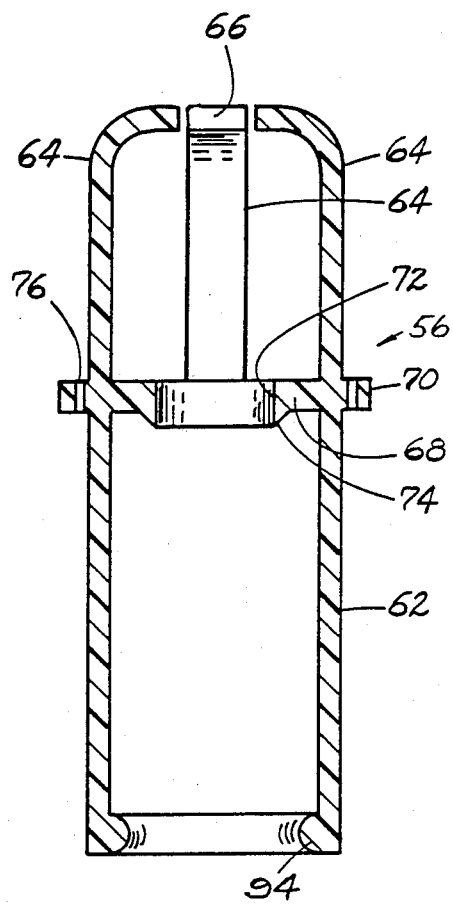
FIG. 4 is a longitudinal cross-sectional view of a component of the valve assembly used in the dispenser.

With reference to FIGS. 1, 3 and 4, the valve assembly 16 is located at the outlet 52 of the metered reservoir 50 for controlling the flow of liquid from the metered reservoir 50. The porous dauber tip 18 is disposed over the end of the valve assembly 16. As shown, the valve assembly comprises a valve housing, generally denoted as the numeral 56, enclosing a valve 58, and a valve spring 60. The valve housing 56 includes a depending barrel 62 and a plurality of flexible fingers 64 spaced apart in a circular array about and extending upwardly from the top marginal edge of the depending barrel 62. The fingers 64 converge toward their distal ends forming a cylindrical basket-like structure approximating the contour of the dauber tip 18. Further, the convergent distal ends of the fingers 64 define an opening 66 coaxial with the depending barrel 62. Proximate the interface of the fingers 64 and the depending barrel 62, there is located an inwardly projecting circumferential flange 68, and an outwardly projecting circumferential flange 70. The inwardly projecting flange 68 defines a central valve stem aperture 72 coaxial with the opening 66 at the distal ends of the fingers 64. The inwardly projecting flange 68 includes a circular lip 74 coaxial with the valve stem aperture 72 and extending downwardly from the bottom side of the inwardly projecting flange 68 toward and coaxial with the valve housing depending barrel 62. The circular lip 74 defines a valve seat. The outwardly projecting circumferential flange 70 forms an anchoring flange for the skirt dauber tip 18 and, as shown is embedded into the material of the dauber tip. The upper surface of the outwardly projecting flange 70 is formed with a plurality of spaced apart holes 76 in a circular array about the flange 76 which function to further secure the tip 18 in place.

Figure 6:
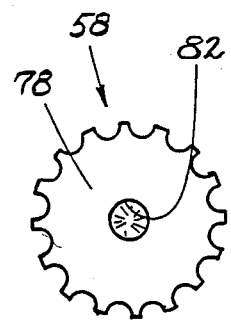
FIG. 6 is a bottom view of the component of FIG. 5.
Figure 5:
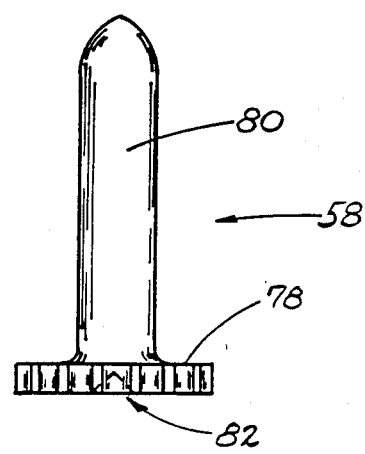
FIG. 5 is a side view of another component of the valve assembly used in the dispenser.

With reference to FIGS. 3, 5, and 6, the valve 58 comprises a generally circular valve head 78 and an integrally formed valve stem 80 projecting coaxially from the top side of the valve head 78. The valve head 78 is of larger diameter than the diameter of the valve seat lip 74, and its perimeter is formed with serrations which provide selected liquid flow through paths for the liquid. The valve lip 74 is adapted to sealingly contact the top side of valve head 78 radially inwardly of the serrations. In addition, the bottom side of the valve head 78 is formed with a small centrally located pivot cavity 82. As shown, the cavity 82 is generally concially shaped. The valve stem 80 is longer than the distance between the valve stem aperture 72 and the opening 66 at the distal ends of the fingers 64 measured coaxially of the valve stem aperture 72 and opening 66. The valve 58 is positioned within the valve housing 56 with the top side of the valve head 78 positioned adjacent the bottom side of the valve seat lip 74 and the valve stem 80 projecting upwardly through the valve stem aperture 72 of the inwardly projecting circumferential flange 68 and through the opening 66 at the distal ends of the fingers 64 to project outwardly beyond the distal ends of the fingers 64.

With references to FIGS. 1 and 3, the dauber tip 18 is fabricated of a porous material, for example, polyurethane. The entire exterior surface of the dauber tip 18 can be covered with flocking. The tip 18 is coaxially located over the basket-like structure defined by the fingers 64 and the outwardly projecting circumferential flange 70. The outer contour of the tip 18 is convex, and preferably has a rather sharp pointed contour such as a bullet. The tip 18 is formed with a blind ended pocket 84 for receiving the basket-like structure of fingers 64 such that the dauber tip 18 is coaxial with the valve stem aperture 72 of the flange 68 and open to the valve stem aperture 72. The end of the valve stem 80 projecting beyond the distal end of the fingers 64 of the valve housing 56 is embedded into the porous dauber tip material at the blind end of the pocket 84.

Figure 7:
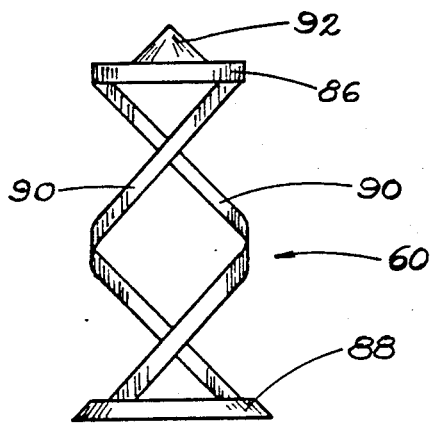
FIG. 7 is a side view of a further component of the valve assembly.

With reference to FIGS. 3 and 7, a valve spring 60 is shown as comprising a valve head contact plate 86 at one end, a valve spring retainer ring 88 at the other end, and at least one helical coil 90 integrally formed at its opposite end with the contact plate 86 and retainer ring 88, respectively. The valve head contact plate 86 is generally circular in shape and is of a smaller diameter than the valve head 78. Further, the valve head contact plate 86 has a pivot point structure 92 projecting upwardly from the coaxial with the top side of the head contact plate 86. The pivot point structure 92 is sized and configured to fit into the pivot cavity 82 in the bottom side of the valve head 78. The pivot point structure 92 and pivot cavity 82 cooperate to define pivot means allowing the valve 58 to pivot with respect to the valve spring 60. The valve spring 60 is located concentrically within the depending barrel 62 of the valve housing 56 with the valve head contact plate 86 adjacent the bottom side of the valve head 78 and the pivot point 92 located in the pivot cavity 82. The valve spring 60 is retained in the depending barrel 62, under compression, by the bottom swaged end 94 of the depending barrel 62 in contact with the valve spring retainer ring 88. Therefore, the helical coil 90 biases the valve head contact plate 86 against the valve head 78 which forced the valve head 78 in sealing contact with the valve seat lip 74 of the valve seat flange 68 closing the valve aperature 72 preventing liquid from flowing from the metered reservoir 50 into the tip 18.

The depending barrel 62 has an outside diameter generally equal to the inside diameter of the sleeve 14 at the reservoir outlet opening 52 so that the depending barrel 62 concentrically fits into the reservoir outlet opening 52 of the sleeve 14 with a press fit.

With reference to FIGS. 1 and 2, the metered reservoir 50 of the sleeve 14 is sized to receive and store a predetermined volume of liquid from the bottle 12. For example, the bottle can be sized to hold 10 cc of a liquid and the reservoir 50 can be sized to hold 1 cc of the liquid.

The bottle 12 can be fabricated of virtually any convenient material, however, it is contemplated that it be fabricated of a pliable plastic material. In addition, it is also contemplated that the bottle 12 would be fabricated of a transparent material so that the volume of liquid in the bottle 12 would be visible. The bottle 12 can also include indicia on its side wall to measure the volume of liquid in the bottle 12.

Now with reference to FIGS. 1 and 2, to use the dispenser 10, the user merely grasps the sleeve 14 in one hand and the bottle 12 in the other hand, and pulls the bottle 12 axially away from or out of the sleeve 14 against the biasing force of the springs 54. As the bottle 12 is moved away from the sleeve 14, the nozzle 26 is moved away from the conical surface 48 of the first valve lip 46 thereby opening the liquid flow-through apertures 36 in the conical wall 34 of the nozzle 26 allowing the liquid to flow from the bottle 12 into the reservoir 50. To initiate liquid flow from the bottle 12 into the reservoir 50, the dispenser 10 may be held upside-down so that liquid will flow from the bottle 12 into the reservoir 50 by gravity. Alternatively, when the bottle 12 is fabricated of a pliable material, the user can squeeze the cylindrical body 20 of the bottle 12 to force into the reservoir 50. Next, the user need only release the grasp of the bottle 12 allowing the bottle 12 to move axially back toward or into the sleeve 14 under the biasing force of the springs 54. As the bottle 12 moves axially back into the sleeve 14, the O-ring seal 40 on the nozzle 26 wipes along the internal wall of the sleeve 14 forcing any liquid which may be in the sleeve between the nozzle 26 and the first valve lip 46 either into the reservoir 50 if there is still an unfilled volume therein, or back into the bottle 12 through the apertures 36 of the nozzle 26 if the reservoir 50 is full of liquid.

In order to apply the metered amount of liquid in the reservoir 50 to a surface, the user places the dauber tip 18 against the surface upon which the liquid is to be applied with enough force to even slightly distort or compress the tip 18. The compression of the tip 18 causes the valve stem 80 embedded into the tip 18 at the blind end of pocket 84 to pivot or rock the stem 80 of the valve 58 about the pivot point 92 of the valve head contact plate 86 against the biasing force of the fingers 64, thus, moving a portion of the valve head 78 away from the valve seat lip 74 against the biasing force of the valve spring 60. When this occurs, liquid is allowed to flow from the reservoir 50 past the portion of the serrated peripheral edge of the valve head 78 lifted from the sealing lip 74, and into material of the tip 18 whereat the liquid is applied to the object. The outside surface of the dauber tip 18 can be coated with a flocking 23 to provide for a smooth uniform coating applied to the surface. When the tip 18 is removed from the object to which the liquid has been applied, the resilient fingers 64, in conjunction with the force exerted by the valve spring 60, moves the valve stem 80 back to center within the pocket 84 about the pivot point 92, and the helical coil 90 forces the valve head 78 back into total contact with the valve seat lip 74.

The foregoing detailed description is given primarily for clearness of understanding and no unnecessary limitiations are to be understood therefrom for modifications will become obvious to those skilled in the art upon reading this disclosure and may be made without departing from the spirit of the invention and scope of the appended claims.

I claim:

1. A liquid dispenser comprising:
   a bottle for containing a supply of liquid to be dispensed;
   means defining an outlet for the liquid at one end of the bottle;
   a sleeve having a longitudinal axis coaxially located with the central axis of the outlet defining means of the bottle and receiving therein the outlet defining means of the bottle, and selectively movable along the coaxis of the bottle outlet defining means and the sleeve in both directions;
   first valve means associated with the sleeve for closing the liquid outlet of the bottle when the sleeve has moved in a first direction along the coaxis, and for opening the liquid outlet of the bottle when the sleeve has moved in a second direction along the coaxis;
   biasing means for biasing the sleeve in the first direction closing the liquid outlet of the bottle;
   means defining a metered liquid reservoir in the sleeve for receiving liquid from the bottle when the sleeve is moved in the second direction causing the first valve means to open the liquid outlet of the bottle;
   a porous dauber tip in liquid-flow communication with the reservoir for receiving liquid therefrom; and,
   second valve means in the path of liquid communication between the reservoir and dauber tip operable between an open position and a closed position for controlling the flow of liquid from the reservoir to the dauber tip.

2. The liquid dispenser of claim 1, wherein the liquid reservoir is disposed in the sleeve to the opposite side of the first valve means from the bottle outlet.

3. The liquid dispenser of claim 1, wherein the first valve means comprises a lip on the inside of the sleeve for covering the liquid outlet of the bottle when the sleeve has moved the full extent in the first direction.

4. The liquid dispenser of claim 1, further comprising sleeve stop means for limiting the movement of the sleeve in the first direction.

5. The liquid dispenser of claim 1, further comprising seal means associated with the liquid outlet of the bottle for sealing against the interior surface of the sleeve as the sleeve moves in both the first and second directions along the coaxis.

6. The liquid dispenser of claim 1, wherein the proximal end of the sleeve coaxially receives the outlet of the bottle, and the metered reservoir is defined proximate the distal end of the sleeve.

7. The liquid dispenser of claim 6, wherein the outlet of the reservoir is defined at the distal end of the sleeve.

8. The liquid dispenser of claim 7, wherein the dauber tip is disposed at the distal end of the sleeve.

9. The liquid dispenser of claim 7, wherein the second valve means is disposed proximate the distal end of the sleeve.

10. The liquid dispenser of claim 1, wherein the second valve means comprises biasing means closing the second valve means.

11. The liquid dispenser of claim 10, wherein the second valve means is operatively associated with the dauber tip so that when the dauber tip is distorted the second valve is opened allowing liquid to flow from the reservoir to the dauber tip.

12. The liquid dispenser of claim 11, wherein the first valve means and the second valve means are independently actuated from each other.

13. The liquid dispenser of claim 1, wherein the bottle is fabricated of a pliable material.

14. The liquid dispenser of claim 12, wherein the bottle is fabricated of a transparent material.

15. The liquid dispenser of claim 1, wherein at least a portion of the second valve means is disposed within the reservoir.

16. The liquid dispenser of claim 15, wherein the second valve means comprises biasing means for biasing the second valve means to the closed position.

17. The liquid dispenser of claim 16, wherein the biasing means of the second valve means is disposed within the reservoir.

* * * * *